(12) United States Patent
Hiroki

(10) Patent No.: US 8,851,901 B2
(45) Date of Patent: Oct. 7, 2014

(54) ROTARY CONNECTOR DEVICE

(71) Applicant: Kenji Hiroki, Shiga (JP)

(72) Inventor: Kenji Hiroki, Shiga (JP)

(73) Assignees: Furukawa Automotive Systems Inc., Shiga (JP); Furukawa Electric Co., Ltd., Tokyo (JP)

( * ) Notice: Subject to any disclaimer, the term of this patent is extended or adjusted under 35 U.S.C. 154(b) by 114 days.

(21) Appl. No.: 13/632,899

(22) Filed: Oct. 1, 2012

(65) Prior Publication Data

US 2013/0094172 A1   Apr. 18, 2013

Related U.S. Application Data

(63) Continuation of application No. PCT/JP2011/057342, filed on Mar. 25, 2011.

(30) Foreign Application Priority Data

Mar. 30, 2010   (JP) ................. 2010-078595

(51) Int. Cl.
| | |
|---|---|
| *H01R 39/00* | (2006.01) |
| *H01R 35/04* | (2006.01) |
| *H01R 35/02* | (2006.01) |
| *B60R 16/027* | (2006.01) |
| *H02G 11/02* | (2006.01) |

(52) U.S. Cl.
CPC ............. *H02G 11/02* (2013.01); *H01R 35/04* (2013.01); *H01R 35/025* (2013.01); *B60R 16/027* (2013.01)
USPC ................. 439/15; 439/16; 439/164

(58) Field of Classification Search
CPC ................................... H01R 35/025
USPC .............................. 439/15, 16, 164
See application file for complete search history.

(56) References Cited

U.S. PATENT DOCUMENTS

| | | | | |
|---|---|---|---|---|
| 7,594,819 | B2 * | 9/2009 | Araki et al. | 439/164 |
| 8,382,500 | B2 * | 2/2013 | Adachi | 439/164 |
| 2009/0156034 | A1 * | 6/2009 | Araki et al. | 439/164 |
| 2013/0065413 | A1 * | 3/2013 | Adachi et al. | 439/164 |
| 2013/0095670 | A1 * | 4/2013 | Adachi et al. | 439/15 |

(Continued)

FOREIGN PATENT DOCUMENTS

| | | |
|---|---|---|
| JP | 09-055275 A | 2/1997 |
| JP | 2000-068020 A | 3/2000 |

(Continued)

OTHER PUBLICATIONS

International Search Report issued in PCT/JP2011/057342, mailed on May 10, 2011 (6 pages).

*Primary Examiner* — Hae Moon Hyeon
(74) *Attorney, Agent, or Firm* — Osha Liang LLP

(57) ABSTRACT

A rotary connector device includes a stator and a rotator, which relatively rotate with respect to each other. An accommodating space for accommodating cables for electrically connecting the rotator and the stator in a state wound in a circle is formed inside the stator and the rotator is formed. A guide protruding piece which protrudes toward the accommodating space above the cables wound in a circle and which guides the cables from above is formed on an upper portion of an outer peripheral tube portion provided in the stator. A lower surface of the guide protruding piece is formed into a shape which is deformed upward gradually toward a tip.

2 Claims, 6 Drawing Sheets

(56) References Cited

U.S. PATENT DOCUMENTS

| | | | |
|---|---|---|---|
| 2013/0095671 A1* | 4/2013 | Arakawa | 439/15 |
| 2013/0095672 A1* | 4/2013 | Hirai | 439/15 |
| 2013/0095680 A1* | 4/2013 | Hirai | 439/164 |
| 2013/0248220 A1* | 9/2013 | Arakawa | 174/79 |
| 2013/0252441 A1* | 9/2013 | Yamaguchi | 439/15 |
| 2013/0292234 A1* | 11/2013 | Hiroki | 200/61.34 |
| 2014/0011374 A1* | 1/2014 | Adachi | 439/13 |

FOREIGN PATENT DOCUMENTS

| | | |
|---|---|---|
| JP | 2002-345140 A | 11/2002 |
| JP | 2003-022879 A | 1/2003 |
| JP | 2009-143491 A | 7/2009 |
| JP | 2009-217974 A | 9/2009 |

* cited by examiner

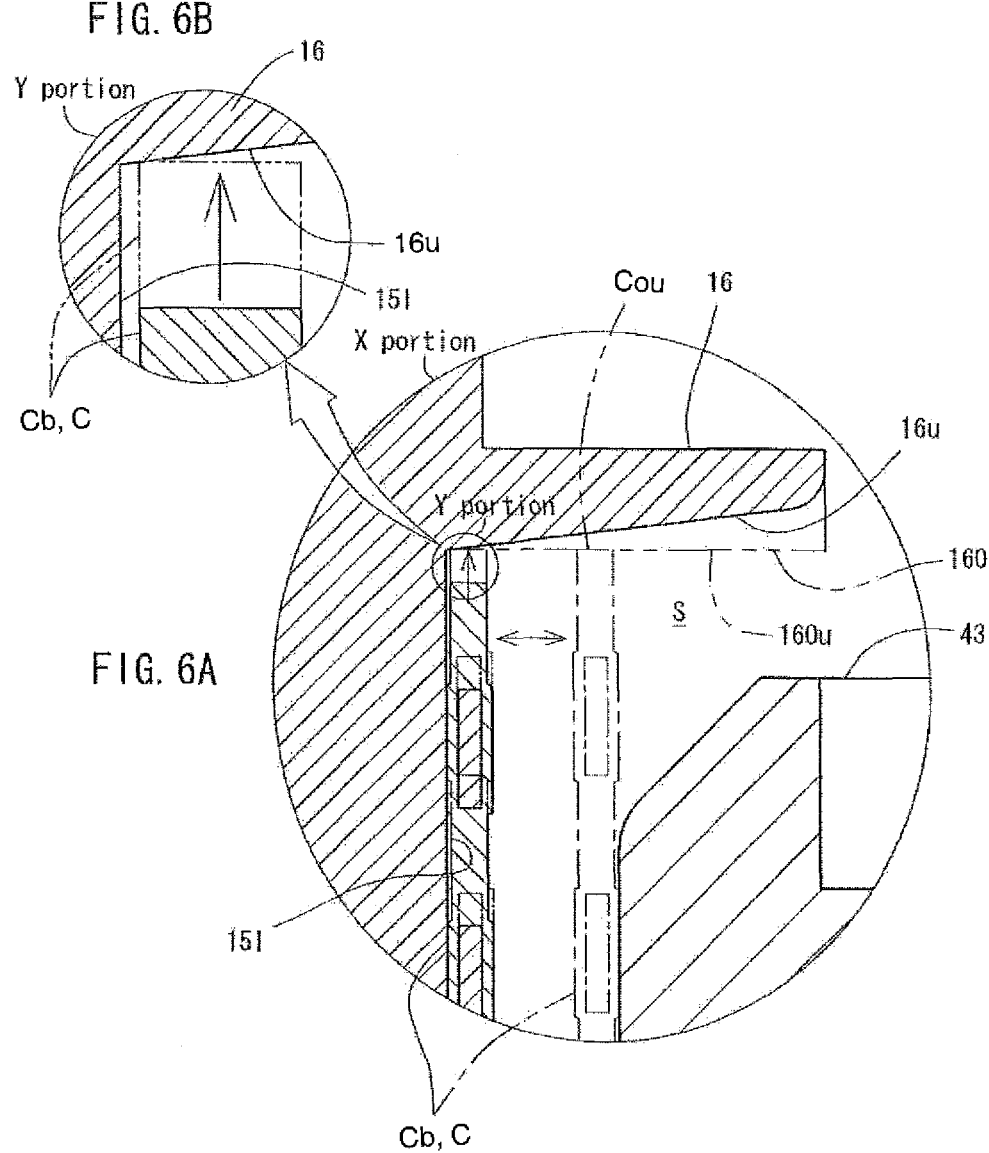

ROTARY CONNECTOR DEVICE

TECHNICAL FIELD

The present invention relates to a rotary connector device mounted to a vehicle such as automobiles and to a rotary connector device used for electrically connecting between a steering wheel side and an automobile body side.

BACKGROUND ART

The rotary connector device such as steering roll connector which is mounted on a vehicle such as automobiles and the like includes a cable housing formed of a stator (stator case) and a rotator (rotator case) to be assembled on a same axis so as to be relatively rotatable.

The rotary connector device has the stator secured to the automobile body and the rotator assembled on the steering wheel in the cable housing. Further, the rotary connector device electrically connects between the automobile body and the steering wheel, for example, horn module, air bag module, power supply, and the like, via flat cables accommodated in an accommodating space in the cable housing.

A rotary connector device described in Patent Document 1 is one of such rotary connector devices.

In the rotary connector device described in Patent Document 1, a retainer (guiding member) for guiding flat cables (band-shaped transmission lines), which are accommodated in an accommodating space (ring space) formed in a cable housing, is located on a bottom surface of the accommodating space.

The retainer is formed of a plate-like guide ring which has a C-shape in a plan view and is located on the bottom surface of the accommodating space so as to be rotatable around a rotating shaft of a rotator, and a plurality of rollers which are shaft-supported in respective portions equally dividing a circumferential direction of the guide ring so as to be rotatable around rotating shafts parallel to the rotating shaft of the rotator.

The flat cables are accommodated in the accommodating space in a state wound in a circle, with a radially internal end being wound to an inner peripheral tube portion (inner tube shaft portion) of the rotator, a radially external end being wound to an outer peripheral tube portion (outer tube portion) of the stator, and a middle portion being wound back into a U-shape.

In association with a rotating operation of the steering wheel, the radially internal end and external end of a flat cable are wound to and released from the inner peripheral tube portion and the outer peripheral tube portion, respectively, in the accommodating space. Since the retainer rotates in the ring space in the circumferential direction following such movements, the flat cable can be kept accommodated in the cable housing with no damage.

However, when the flat cable wound in a circle in the accommodating space bends upward, or a vehicle vibrates while it is running, an upper end portion of the flat cable sometimes contacts an upper flange (top plate) of the rotator which covers over the accommodating space, causing a problem that an annoying sound is made by the contact.

Particularly, when the steering wheel is being manipulated, the rotator rotates with respect to the stator. Thus, when the flat cable contacts the rotator, it contacts the rotator in a rotating state and the rotator and the flat cable scrape (slide) against each other, and an annoying sound can be easily made.

Further, when the rotator rotates with respect to the stator, the flat cable is wound to and released from in the accommodating space. Accordingly, the flat cable wound in a circle slides in a radial direction, and the rotator and the flat cable scrape each other heavily causing an annoying sound to be made more easily.

As described above, there is a problem that an annoying sound is made while driving, which becomes a disturbance in comfort driving.

Furthermore, there is also a problem that, if a flat cable contacts repeatedly, the flat cable may be damaged by abrasion.

PRIOR ART DOCUMENT

Patent Document

Patent Document 1: Laid-Open Publication No. 2000-68020

SUMMARY OF THE INVENTION

Problems to be Solved by the Invention

An objective of the present invention is to provide a rotary connector device which can achieve quiet and comfort running with no annoying sound being made even when a flat cable wound in a circle in an accommodating space bends upward, or a vehicle vibrates while it is running, causing the flat cable to collide or scrape against a cable housing, and which can further prevent the flat cable from being damaged by abrasion.

Means for Solving the Problems

The present invention relates to a rotary connector device, in which a rotator including an inner peripheral tube portion and a stator including an outer peripheral tube portion are formed, the stator and the rotator are integrally formed so as to be relatively rotatable with respect to each other, and an accommodating space which accommodates a cable for electrically connecting the rotator and the stator in a wound state is formed inside the stator and the rotator, characterized in that a guide protruding piece which protrudes toward the accommodating space above the wound cable and which guides at least the cable wound near an outer periphery of the accommodating space from above is formed on an upper portion of the outer peripheral tube portion, and a lower surface of the guide protruding piece is formed into a shape which is deformed upward gradually along a protruding direction of the guide protruding piece.

In one embodiment of the present invention, the lower surface of the guide protruding piece may be formed into a tapered shape which inclines upward along the protruding direction.

The lower surface of the guide protruding piece is not limited to the above-described tapered shape which inclines upward along the protruding direction as long as it is a shape which is deformed upward gradually along a protruding direction of the guide protruding piece, and may be various shapes such as a shape which is deformed upward in a curve along the protruding direction.

Effect of the Invention

According to the present invention, a rotary connector device which can achieve quiet and comfort running with no annoying sound being made even when a flat cable wound in a circle in an accommodating space bends upward, or a vehicle vibrates while it is running, causing the flat cable to collide or scrape against a cable housing, and which can further prevent the flat cable from being damaged by abrasion can be provided.

BRIEF DESCRIPTION OF DRAWINGS

FIG. 6A A diagram explaining functions of the steering roll connector of the present embodiment.

FIG. 6B An enlarged view showing a part of FIG. 6A.

DESCRIPTION OF EMBODIMENTS

An embodiment of the present invention is described hereinafter with reference to the drawings.

As shown in FIGS. 1 through 5, a steering roll connector (SRC) 10 according to the present embodiment is formed of a cable housing 11, a retainer 41, and a rotation lock unit 51.

Figure 1:
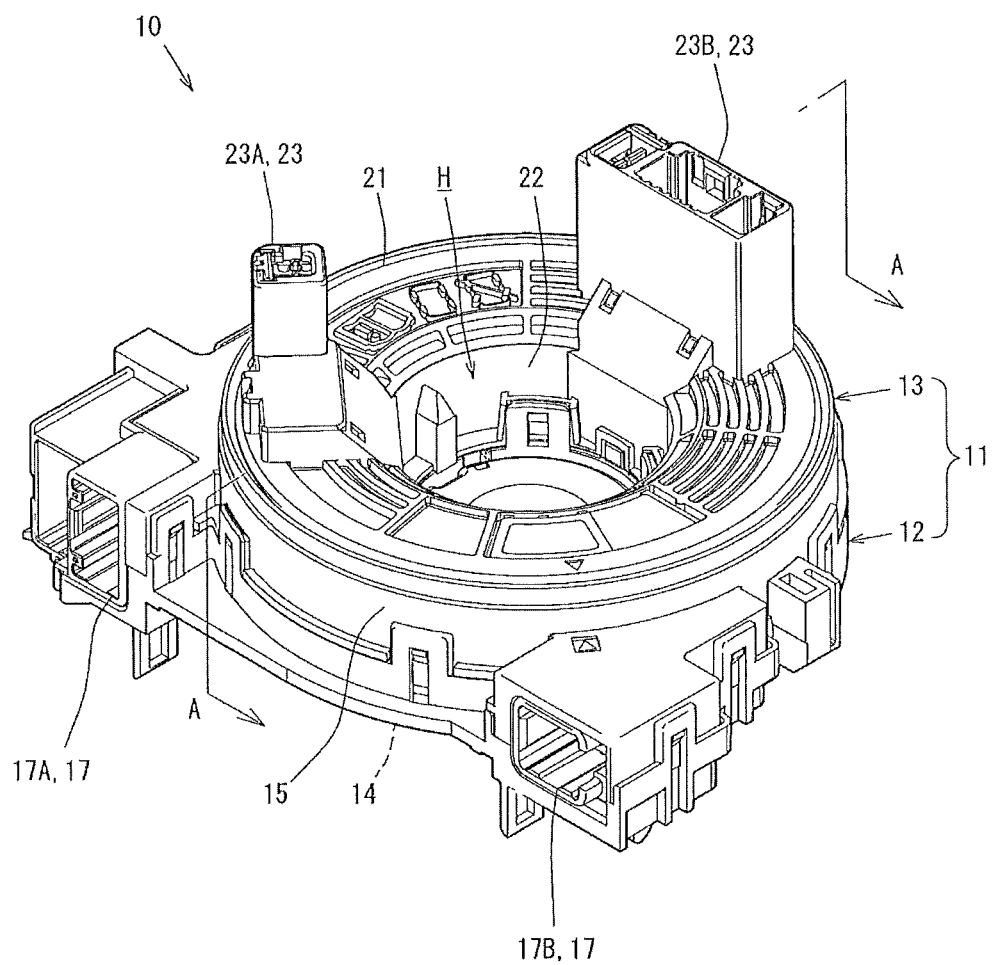
FIG. 1 An outline view of a steering roll connector of the present embodiment.
Figure 2:
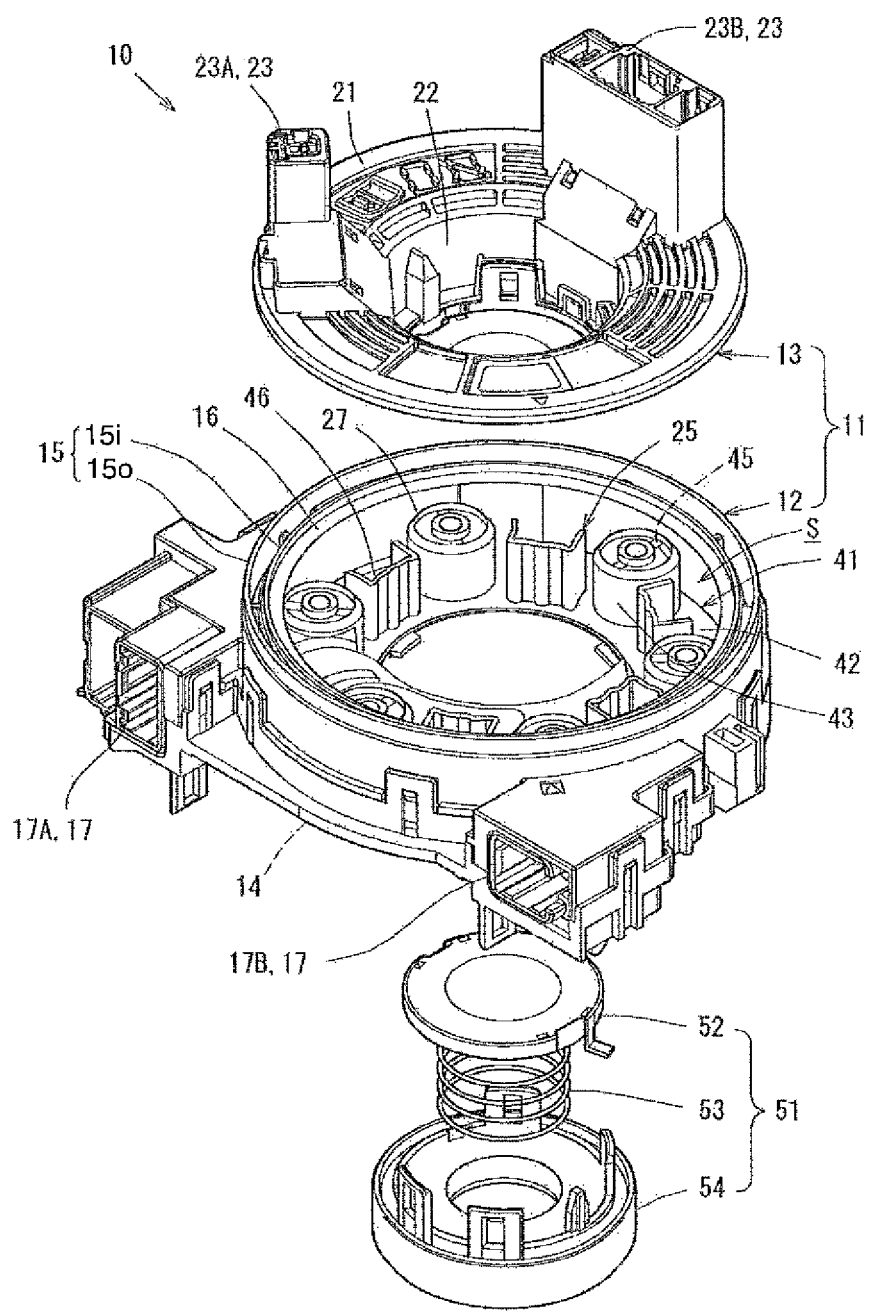
FIG. 2 An exploded perspective view of the steering roll connector of the present embodiment.
Figure 3:
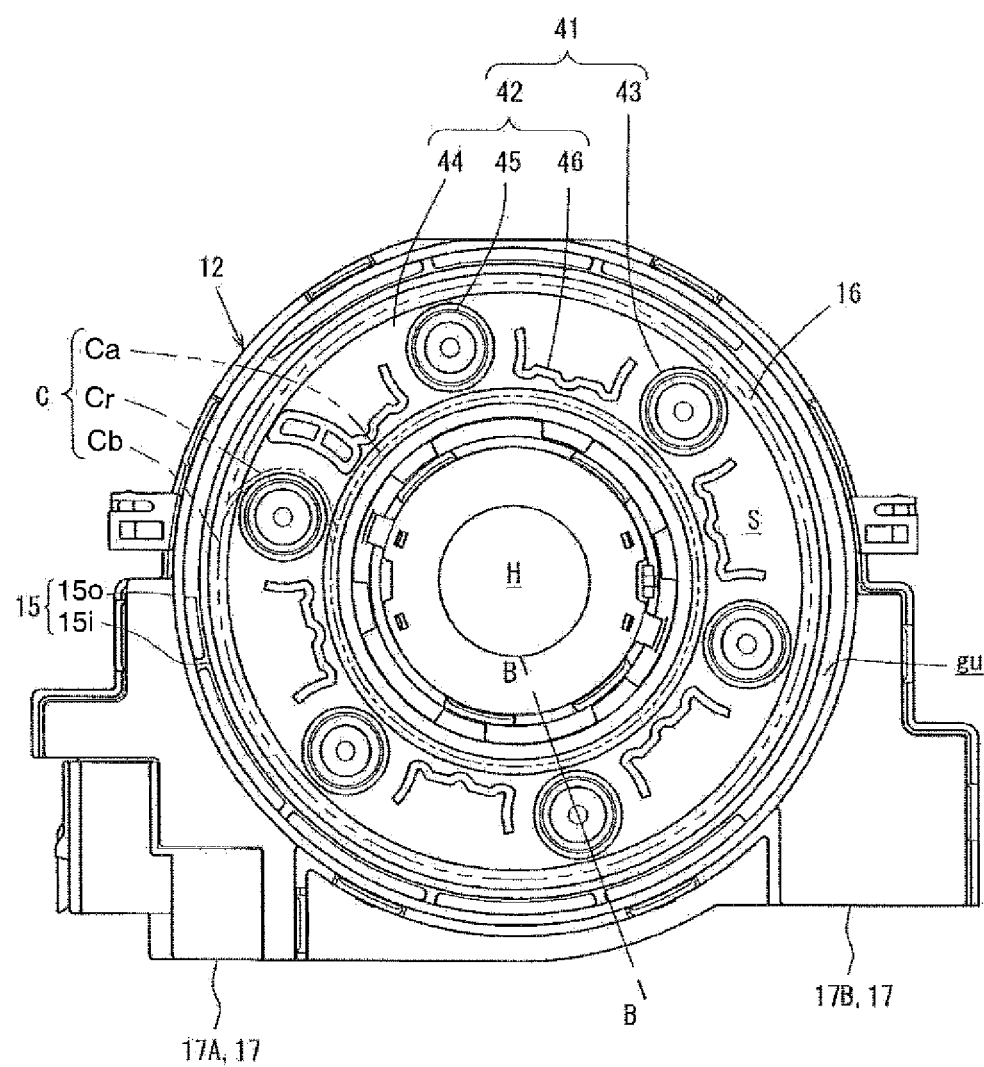
FIG. 3 A plan view of the steering roll connector of the present embodiment without a rotator.
Figure 5:
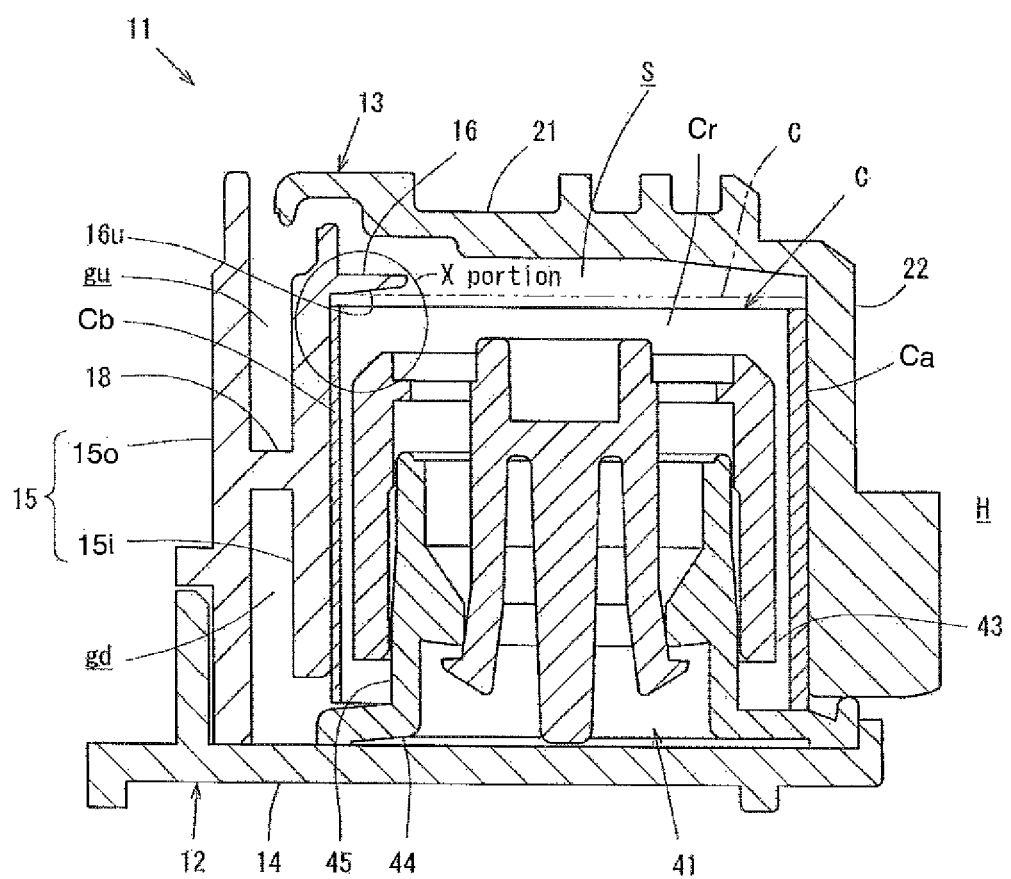
FIG. 5 An enlarged side view showing a part of FIG. 4.

FIGS. 1 and 2 are respectively outline view and exploded perspective view of the steering roll connector. FIG. 3 is a plan view of the steering roll connector of the present embodiment without a rotator which will be described later. FIG. 3 is a cross sectional view on arrow along line A-A in FIG. 1. FIG. 5 is an enlarged side view showing a part corresponding to line B-B in FIG. 3 in the steering roll connector.

The cable housing 11 is formed into a substantially tubular shape with an insertion hole H which penetrates through in a shaft direction of a steering shaft (not shown) being formed in a central portion in a plan view. The insertion hole H is formed to have a diameter which allows a steering shaft supported by a column of the steering (not shown) to be inserted.

To an upper end of the steering shaft, a steering wheel for performing a rotating operation is secured.

The cable housing 11 is formed of a stator 12 and a rotator 13 which can relatively rotate with respect to each other. In the cable housing 11, an accommodating space S for accommodating a flexible flat cable C (hereinafter, referred to as "flat cable C") in an appropriately wound state is formed as shown in FIGS. 2 through 5.

The stator 12 is secured to an appropriate member of an automobile body, for example, a combination bracket switch (not shown) of the steering column, and is attached so as to be relatively rotatable with respect to the steering wheel. The stator 12 is formed of a securing side ring plate 14 formed in a ring shape as a bottom plate and an outer peripheral tube portion 15 of a tubular shape, which is elongated vertically from an outer peripheral edge of the securing side ring plate 14. The stator 12 is integrally formed by fitting the outer peripheral edge of the securing side ring plate 14 to a lower edge of the outer tube portion 15.

Figure 4:
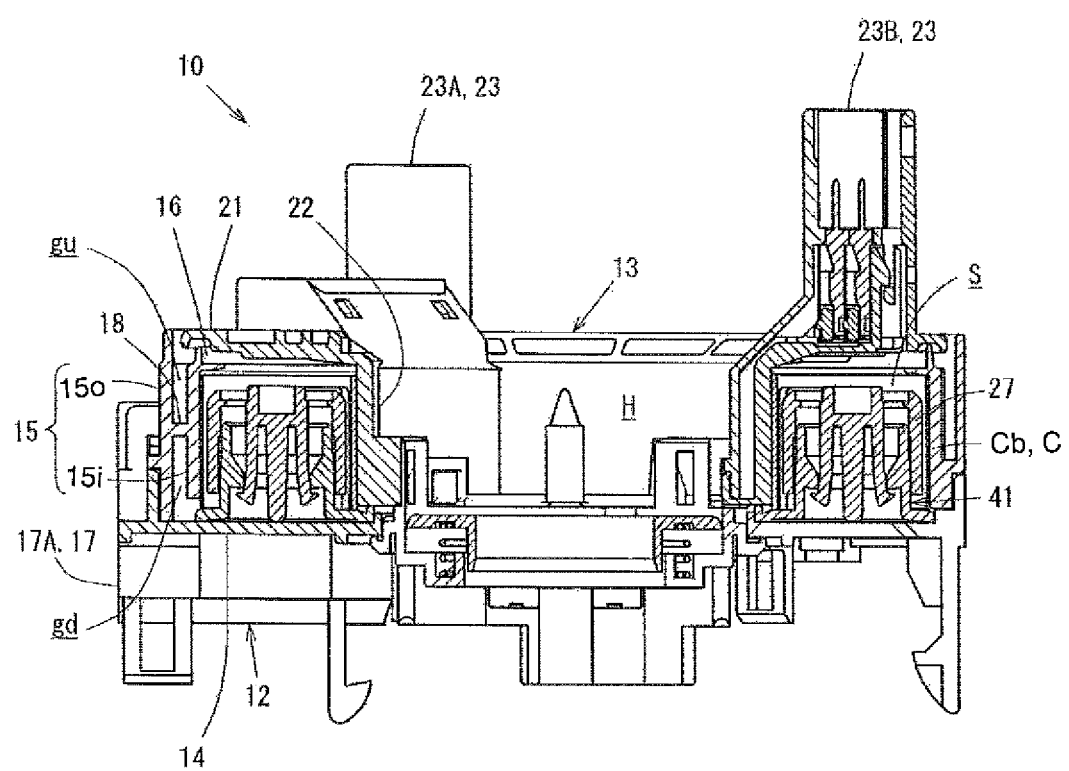
FIG. 4 A cross sectional view on arrow along line A-A in FIG. 1.

As shown in FIGS. 4 and 5, the outer peripheral tube portion 15 is formed of an external side outer peripheral tube portion 15o of a tubular shape, and an internal side outer peripheral tube portion 15i of a tubular shape which has a diameter slightly smaller than the external side outer peripheral tube portion 15o, and has a double-layer structure with the external side outer peripheral tube portion 15o and the internal side outer peripheral tube portion 15i being arranged in a concentric pattern so as to oppose each other closely in a radial direction.

The external side outer peripheral tube portion 15o and the internal side outer peripheral tube portion 15i are integrally coupled by a coupling portion 18 in a middle portion in a shaft direction of the steering wheel (a vertical direction in FIGS. 4 and 5). A gap formed in a radial direction between the external side outer peripheral tube portion 15o and the internal side outer peripheral tube portion 15i is divided by the coupling portion 18 in the vertical direction. As shown in FIG. 5, two trenches gu and gd are formed so as to be opened in upward and downward directions, respectively.

Further, as shown in FIG. 5, on an upper portion of the internal side outer peripheral tube portion 15i, a guide protruding piece 16 which protrudes to the internal side in the radial direction (radially inward direction) toward the accommodating space S above the flat cable C wound in a circle in the accommodating space S and which guides the flat cable C from above is formed in a flange shape.

The guide protruding piece 16 protrudes straightly to the accommodating space S along an inner peripheral edge of the upper portion of the internal side outer peripheral tube portion 15i in a ring shape in a plan view. However, a lower surface 16u of the guide protruding piece 16 is formed in a tapered shape which inclines upward along a radially internal direction.

To the stator 12, a stator side connector 17 is attached.

The stator side connector 17 is formed of a first stator side connector 17A and a second stator side connector 17B. The first stator side connector 17A and the second stator side connector 17B are located outside the outer peripheral tube portion 15 (the external side outer peripheral tube portion 15o) such that connecting ports thereof face the same direction with a predetermined space therebetween.

The rotator 13 is formed of a rotating side ring plate (top plate) 21 which is formed into a ring shape as a top plate and an inner peripheral tube portion 22 of a tubular shape which is elongated vertically from an inner peripheral edge of the rotating side ring plate 21. The rotator 13 has a structure such that it rotates together with the steering wheel. The rotator 13 can rotate around a shaft same as the rotating shaft of the steering with respect to the stator 12.

The rotating side ring plate 21 is located so as to oppose the securing side ring plate 14 in a direction of the rotating shaft of the rotator 13.

The direction of the rotating shaft of the rotator 13 is same as the shaft direction of the steering wheel as described above (the vertical direction in FIGS. 4 and 5).

The inner peripheral tube portion 22 is located so as to oppose the outer peripheral tube portion 15 on the internal side in a radial direction.

To the rotator 13, the rotator side connector 23 which rotates together with rotation of the rotator 13 is attached.

The rotator side connector 23 is formed of a first rotator side connector 23A and a second rotator side connector 23B.

The first rotator side connector 23A and the first stator side connector 17A, and the second rotator side connector 23B and the second stator side connector 17B are electrically connected to each other by the flat cable C located in the accommodating space S.

The stator side connector 17 is connected to cables (not shown) drawn out from an electric circuit or the like on an automobile body in a lower column cover (not shown).

The rotator side connector 23 is connected to cables (not shown) drawn out from an electric circuit such as horn switch, air bag unit and the like, for example.

Further, the retainer 41 described above is formed of a plurality of rotation rollers 43 and a base ring 42, and is located so as to be rotatable with a rotating shaft of the rotator 13 being the center in the accommodating space S.

The same number of rotation rollers 43 as roller supporting protrusions 45 which will be described later are provided, and are respectively shaft-supported by the roller supporting protrusions 45. Each of the rotation rollers 43 is provided so as to be rotatable with an axis parallel to the rotating shaft of the rotator 13 being the center.

The base ring 42 is formed of a plate-like base ring main body portion 44 which has a ring shape in a plan view, the roller supporting protrusions 45, and a roller outer peripheral side protrusions 46.

The base ring main body portion 44 is located close to the securing side ring plate 14 in a slidable manner, and is formed so as to be relatively rotatable with respect to the stator 12.

The roller supporting protrusions 45 protrude upward in equal intervals in the circumferential direction of the base ring main body portion 44 in a manner that they can shaft-support the rotation rollers 43.

The roller outer peripheral side protrusions 46 protrude upward with respect to the base ring main body 44 such that they guide folded portions of the flat cable C, which are folded around the rotation rollers 43 as will be described later (reversed portions Cr as will be described later), from the radially external side on the outside of the roller supporting protrusions 45.

As shown in FIG. 2, the rotation lock unit 51 is formed of a lock member 52, a spring receiving sleeve 54, and a return spring 53 provided between the lock member 52 and the spring receiving sleeve 54.

By pushing up the spring receiving sleeve 54 in resistance to a biasing force of the return spring 53, the rotator 13 can be locked by the lock member 52 so as not to relatively rotate with respect to the stator 12. By inserting a boss portion (not shown) of a metal core of the steering wheel, lock by the lock member 52 can be released so as to allow free relative rotation.

The flat cable C is a flexible transmission line of a band shape which has a plurality of flat rectangular conductors Ca aligned parallel in predetermined pitches and is coated with an electric insulator Cb.

Two flat cables C are provided in the accommodating space S, and two cables are overlapped and wound in a circle in the accommodating space S. One end of one of the two overlapped flat cables C in a length direction is connected to the first stator side connector 17A, and one end of the other of the two flat cables C in a length direction is connected to the second stator side connector 17B (not shown).

The other end of the one of the two overlapped flat cables C in the length direction is connected to the first rotator side connector 23A, and the other end of the other of the two flat cables C in the length direction is connected to the second rotator side connector 23B (not shown).

With such a structure, the flat cable C between one end and the other end in the length direction is accommodated in the accommodating space S in a state appropriately wound in a circle.

Specifically, the flat cables C are drawn into the accommodating space S from the first stator side connector 17A and the second stator side connector 17B in the accommodating space S, and as shown in FIGS. 3 through 5, an outer wound portion Co which is wound along an inner peripheral surface of the outer peripheral tube portion 15 of the stator 12 (internal side outer peripheral tube portion 15i) on the outside of the retainer 41 is formed.

Accordingly, a proximal end of the outer wound portion Co is secured at the position of the stator side connector 17.

As described above, two flat cables C are overlapped and wound in a circle as a pair in the accommodating space S. However, for the sake of convenience, only one is shown in a state wound in a circle in FIGS. 3 through 5.

As shown in FIG. 3, the flat cable C is wound to one of the plurality of the rotation rollers 43 into a U-shape in the middle of the length direction to form a reversed portion Cr which has a reversed direction.

Then, an inner wound portion Ci is formed by winding the other end of the flat cable C in the length direction along an outer peripheral surface of the inner peripheral tube portion 22 of the rotator 13 on the inside of the retainer 41. As shown in FIGS. 3 through 5, the flat cables C are finally drawn out from the accommodating space S and are connected to the first rotator side connector 23A and the second rotator side connector 23B.

Accordingly, a proximal end of the inner wound portion Ci is secured at the position of the rotator connector 23.

In the accommodating space S, the flat cables C are either wound to or released from between the outer wounding portions Co and the inner wounding portions Ci when the rotator 13 rotates with respect to the stator 12.

The reversed portions Cr of the flat cables C appropriately rotate together with the retainer 41 so as to follow changes in a balance in wound states between the outer wound portions Co and the inner wound portions Ci. In this way, the steering roll connector 10 can always retain the flat cables C aligned in the wound state in the accommodating space S, and also enables a smooth rotating operation of the steering wheel.

The steering roll connector 10 as described above can achieve various functions and effects as follows.

The steering roll connector 10 has the guide protruding piece 16 formed on the upper portion of the internal side outer peripheral tube portion 15i so as to protrude toward the accommodating space S in a flange shape as described above.

Specifically, the guide protruding piece 16 is formed so as to protrude in a flange shape toward the accommodating space S (radially internal direction) above an upper edge of the flat cables C, which are wound in a circle along the radial direction in the accommodating space S, and to guide at least the outer wound portion Co of the flat cables C from above in the internal side outer peripheral tube portion 15i.

With such a structure, even when a vehicle vibrates while it is running or the flat cable C wound in a circle bends upward, the guide protruding piece 16 guides the outer wound portion Co of the flat cable C from above, and an annoying sound made by the flat cable C wound in a circle in the accommodating space S colliding or scraping against the rotating side ring plate 21 of the rotator 13 can be avoided.

Specifically, in the conventional steering roll connector with no guide protruding piece 16 being provided on the upper portion of the internal side outer peripheral tube portion 15i (not shown), the entire upper end portion of the flat cable C wound in a circle, specifically, both the outer wound portion Co and the inner wound portion Ci may contact a lower surface of the rotating side ring plate 21 of the rotator 13, which rotates with respect to the stator 12. Since the contact area is larger, a large colliding sound or a scraping sound can be easily made.

In association with the rotating operation of the steering wheel, the rotator 13 rotates with respect to the stator 12. At the same time, the outer wound portion Co of the flat cable C is wound to and released from the inner peripheral surface of the internal side outer peripheral tube portion 15i. During this time, the outer wound portion Co slides in a radial direction between an inner periphery of the internal side outer peripheral tube portion 15i and an outer periphery of the retainer 41.

Accordingly, during the rotating operation of the steering wheel, when the rotator 13 and the flat cable C contact against each other, an annoying sound particularly caused by scraping is readily made.

To handle this problem, the guide protruding piece 16 is provided as described above. In this way, even when a vehicle vibrates while it is running or the flat cable C wound in a circle in the accommodating space S bends upward, only the outer wound portion Co of the flat cable C contacts the guide protruding piece 16 as the flat cable C shown by a phantom line in FIG. 5.

Therefore, when the rotator 13 rotates with respect to the stator 12 and the flat cable C wound in a circle in the accommodating space S slides in the radial direction during the rotating operation of the steering wheel, the contact area of the flat cable C with the guide protruding piece 16 can be kept small, and an annoying sound can be significantly suppressed.

Further, the lower surface 16u of the guide protruding piece 16 is formed into a tapered shape which inclines upward in the radially internal direction to the accommodating space S so as to become gradually farther from the cable.

Therefore, even when a vehicle vibrates while it is running or the flat cable C wound in a circle in the accommodating space S bends upward, and the outer wound portion Co of the flat cable C contacts the lower surface 16u of the guide protruding piece 16, only a corner portion on the upper end portion of the outer wound portion Co contacts a proximal end portion of the guide protruding piece 16 from below at a point as shown in FIG. 6B, i.e., is an enlarged view of area Y in FIG. 6A.

In short, by forming the lower surface 16u of the guide protruding piece 16 into a tapered shape as described above, the contact area with the flat cable C can be made significantly small.

FIGS. 6A and 6B are diagrams explaining functions of the guide protruding piece 16. Specifically, FIG. 6A is an enlarged view of area X in FIG. 5, and FIG. 6B is the enlarged view of area Y in FIG. 6A. As described above, two flat cables C are overlapped and wound in a circle as a pair in the accommodating space S. However, only one cable is shown in a state wound in a circle in the figures for the sake of convenience.

Further, for example, when the guide protruding piece 16 is formed to have a lower surface 16u which protrudes straightly in the radially internal direction (see a guide protruding piece 160 shown by a phantom line in FIG. 6A) as a shape different from the present embodiment, the upper end portion Cou of the outer wound portion Co may remain contacting a lower surface 160u of the protruding guide piece 160 as the outer wound portion Co slides in the radial direction as described above. The scraping sound is easily made.

To handle this problem, the lower surface 16u of the guide protruding piece 16 is formed into the tapered shape as described above. In this way, the upper end portion Cou of the outer wound portion Co does not scrape the lower surface 16u of the guide protruding piece 16 when the outer wound portion Co slides in the radial direction. An annoying sound can be significantly suppressed and quiet driving can be achieved.

Further, the guide protruding piece 16 prevents the flat cable C from contacting the rotator 13, and can make the contact area with the guide protruding piece 16 itself significantly small. Thus, it can prevent damage of the flat cables C caused by abrasion.

Furthermore, since the guide protruding piece 16 has a simple flange shape with its lower surface inclined into a tapered shape, it can be readily formed with a low cost. Mass scale production by molding or the like, for example, is also possible.

With respect to correspondence between the structure of the present invention and the above embodiments, the rotary connector device corresponds to the steering roll connector 10. Similarly, the cable wound in a circle near the outer periphery corresponds to the outer wound portion Co and the cable corresponds to the flat cable C.

The present invention is not limited to the above-described embodiment but may be achieved with the various embodiments.

DESCRIPTION OF THE REFERENCE NUMERALS

10 . . . Steering roll connector
12 . . . Stator
13 . . . Rotator
15 . . . Outer peripheral tube portion
15i . . . Internal side outer peripheral tube portion
16 . . . Guide protruding piece
16u . . . Lower surface of guide protruding piece
22 . . . Inner peripheral tube portion
C . . . Flat cable
Co . . . Outer wound portion

The invention claimed is:

1. A rotary connector device, comprising:
a rotator including an inner peripheral tube portion; and
a stator including an outer peripheral tube portion,
wherein the stator and the rotator are integrally formed so as to be relatively rotatable with respect to each other;
an accommodating space, which accommodates a cable for electrically connecting the rotator and the stator in a wound state, formed inside the stator and the rotator; and
a guide protruding piece, which protrudes toward the accommodating space above the wound cable and which guides at least the cable wound near an outer periphery of the accommodating space from above, formed on an upper portion of the outer peripheral tube portion,
wherein a lower surface of the guide protruding piece is formed into a shape which is deformed upward gradually along a protruding direction of the guide protruding piece.

2. The rotary connector device according to claim 1, wherein the lower surface of the guide protruding piece is formed into a tapered shape which inclines upward along the protruding direction.

* * * * *